United States Patent [19]

Nienburg et al.

[11] 3,871,970

[45] Mar. 18, 1975

[54] WORKING UP HYDROFORMYLATION MIXTURES

[75] Inventors: Hans Juergen Nienburg, Ludwigshafen; Rudolf Kummer, Frankenthal, both of Germany

[73] Assignee: Badische Anilin- & Soda-Fabrik Aktiengesellschaft, Ludwigshafen/Rhein, Germany

[22] Filed: Aug. 30, 1972

[21] Appl. No.: 284,759

[30] Foreign Application Priority Data
Sept. 11, 1971 Germany............................ 2145532

[52] U.S. Cl. ................. 203/6, 203/61, 260/604 HF
[51] Int. Cl. ............................................... B01d 3/34
[58] Field of Search .... 260/604 HF, 638 HF; 203/6, 203/61

[56] References Cited
UNITED STATES PATENTS
3,274,263   9/1966   Greene et al. ................. 260/632 HF Primary Examiner—Leon Zitver
Assistant Examiner—Nicky Chan
Attorney, Agent, or Firm—Johnston, Keil, Thompson & Shurtleff

[57] ABSTRACT

A process for working up by distillation hydroformylation reaction mixtures which have been obtained by the reaction of olefins with carbon monoxide and hydrogen at elevated temperature and superatmospheric pressure in the presence of a carbonyl complex of a metal of Group VIII of the Periodic Table which has been modified with an organic phosphine, wherein said mixture is distilled in the presence of a carboxylic acid.

2 Claims, No Drawings

WORKING UP HYDROFORMYLATION MIXTURES

The invention relates to a process for working up by distillation a hydroformylation reaction mixture which has been obtained by the reaction of an olefin with carbon monoxide and hydrogen at elevated temperature and at superatmospheric pressure in the presence of a carbonyl complex of a metal of Group VIII of the Periodic Table.

The aldehydes and alcohols produced in the hydroformylation of olefins with carbon monoxide and hydrogen in the presence of a metal carbonyl complex are usually recovered from the hydroformylation mixture by distillation. Since the carbonyl complex contained in the mixture is unstable under the temperature and pressure conditions used, it has to be previously removed by an expensive method. If metal carbonyl complex passes into the distillation it decomposes with deposition of the metal in question and this eventually results in disturbed operation. The same difficulties apply when metal carbonyl complexes which have been modified with a phosphine are used, although phosphine-modified metal carbonyl complexes are more stable. Moreover when the lastmentioned metal carbonyl complexes are used there is an additional difficulty in the separation of the metal prior to distillation caused by the presence of the phosphine used. An increase in the stability of metal carbonyl complexes in oxo reactions is achieved according to the process described in U.S. Pat. No. 3,278,612 by adding an alkaline compound. This method has the disadvantage however that particularly when using lower olefins the aldehydes produced enter into an aldol reaction. Moreover the alkali builds up if the distillation residue containing the catalyst is reused as catalyst solution for the hydroformylation. According to another method described in German Printed application No. 1,212,953 a phosphine-modified cobalt carbonyl complex has a higher stability in the oxo reaction when a carboxylic acid is added to it. This stabilization is however not enough to prevent deposition of metal in the distillation equipment when the hydroformylation mixture is worked up by distillation.

It is an object of the invention to provide a process by which hydroformylation mixtures may be worked up without having first to remove the metal carbonyl complexes contained therein. Another object of the invention is to provide a process in which deposits of metal do not occur in the distillation equipment. Yet another object of this invention is to provide a process in which the distillation residue can be used again as catalyst solution for the hydroformylation without further pretreatment.

In accordance with this invention these and other objects and advantages are achieved in a process for working up hydroformylation mixtures (which have been obtained by reaction of olefins with carbon monoxide and hydrogen at elevated temperature and at superatmospheric pressure in the presence of a carbonyl complex of a metal of Group VIII of the Periodic Table which has been modified with an organic phosphine) by distillation wherein the hydroformylation mixture is distilled in the presence of a carboxylic acid.

The starting material is a hydroformylation mixture which has been obtained by reaction of an olefin with carbon monoxide and hydrogen at elevated temperature and at superatmospheric pressure in the presence of a carbonyl complex of a metal of Group VIII of the Periodic Table which has been modified with an organic phosphine. The olefin used is generally one having three to twenty carbon atoms and particularly one having seven to sixteen carbon atoms. Linear α-olefins of seven to sixteen carbon atoms have acquired particular industrial significance. Examples of suitable olefins are propylene, heptene cuts, octene cuts, decene cuts and olefin cuts such as are obtained in cracking waxes or in the polymerization of ethylene.

Carbon monoxide and hydrogen are generally used in a volumetric ratio of from 1:4 to 4:1 and the gas mixture is used at least in a stoichiometric ratio to the olefin but preferably in excess, for example of up to three times the stoichiometric ratio. The hydroformylation is advantageously carried out at a temperature of from 140° to 170°C, particularly at a temperature of from 170° to 200°C. Pressures of from 30 to 300 atmospheres gauge are generally used. Particularly good results are obtained when using pressures of from 40 to 120 atmospheres gauge.

The hydroformylation is generally carried out without the additional use of solvents. The olefins used and the hydroformylation products obtained then act as solvents.

Hydroformylation is preferably carried out in the presence of cobalt, rhodium, ruthenium or iridium carbonyl complexes, particularly cobalt or rhodium carbonyl complexes. The carbonyl complex is generally used in an amount of from 0.01 to 2 percent by weight calculated as metal and based on the olefin used. Tertiary organic phosphines which have alkyl of one to thirty carbon atoms, cycloalkyl of five to twelve carbon atoms, aralkyl of seven to ten carbon atoms and aryl of six to ten carbon atoms as substituents are preferred as modifying agents. The radicals may also contain functional groups such as carbonyl, carboxyl or hydroxy groups which are stable under the reaction conditions. Examples of suitable phosphines are: tributylphosphine, trioctylphosphine, tridodecylphosphine, dimethyleicosylphosphine, dimethylphenylphosphine, tribenzylphosphine, methyldioctylphosphine, dibutylcyclohexylphosphine, and dimethyl-ω-carboxydecylphosphine. The amount of the said phosphines used is preferably such that an atomic ratio of metal to phosphorus of from 1:2 to 1:4 is maintained.

A typical hydroformylation mixture contains from 60 to 70 percent by weight of aldehydes and alcohols which contain one more carbon atom than the olefin used, from 15 to 30 percent by weight of acetals and esters of the aldehydes carboxylic acids, and alcohols produced, and also from 2 to 6 percent by weight of metal carbonyl complex and free phosphine.

After the hydroformylation, the mixture is conventionally cooled to 20° to 100°C, the pressure is let down to from 1 to 10 atmospheres and the excess mixture of carbon monoxide and hydrogen is separated. The hydroformylation mixture is then advantageously expanded completely.

The hydroformylation mixture thus obtained is worked up by distillation, the hydrocarbons and valuable products (the aldehydes and alcohols) being taken overhead and the high-boiling fraction (particularly acetals and esters) serving as solvent for the catalyst and the metal complex used as catalyst remaining as distillation residue.

Distillation is carried out in the presence of a carboxylic acid. It is preferred to use a fatty acid of two to eighteen carbon atoms such as acetic acid, propionic acid, butyric acid, caproic acid, 2-ethylhexanoic acid or palmitic acid. Aromatic carboxylic acids of seven to nine carbon atoms, preferably benzoic acid and toluic acid, are also suitable. Polybasic carboxylic acids of the aliphatic and aromatic series are also suitable such as glutaric, adipic or terephtalic acid. Fatty acids of three to ten carbon atoms are especially preferred. From 0.1 to 3 moles, particularly from 0.3 to 1 mole, of carboxylic acid is generally added to the hydroformylation mixture per mole of catalyst metal contained therein. It is advantageous to select the boiling point of the carboxylic acid used so that it is distilled off with the product in the distillation and can be separated from the product easily. This may be ascertained without difficulty by a simple experiment.

The distillation is generally carried out at atmospheric pressure, but preferably in vacuo. A film (Sambay) evaporator may be used for example for the distillation.

It has proved to be particularly advantageous for the addition of the said carboxylic acids to be made after the hydroformylation and separation of excess mixture of carbon monoxide and hydrogen and prior to the distillation.

The residue obtained in the distillation, which contains the catalyst metal used in the hydroformylation is preferably returned to the hydroformylation as the catalyst solution. Some, for example from 2 to 10 % by weight, of the distillation residue is advantageously separated and worked up separately while the major portion has added to it the amount of metal salt which forms a carbonyl complex under the reaction conditions (for example a fatty acid salt) and of phosphine which are equivalent to the amount of catalyst removed. The amount of this withdrawn portion is determined by the need for keeping a constant content of active phosphine in the system.

The aldehydes and alcohols prepared by the process of the invention are suitable for the production of solvents and plasticizers for polymers and also for detergents.

The process is illustrated in the following Examples.

EXAMPLE 1

4 liters per hour of a $C_8$ to $C_{10}$ olefin mixture and 1.5 liters per hour of a distillation residue (consisting essentially of acetals and esters of the corresponding hydroformylation products and also cobalt as a cobalt carbonyl phosphine complex) are metered into the bottom of a vertical high pressure tube having a capacity of 22 liters. The pressure is held at 80 atmospheres gauge by supplying a mixture of carbon monoxide and hydrogen in a volumetric ratio of 1:2 and a temperature of 190°C is maintained. The cobalt concentration in the high pressure tube at the commencement is 0.15 percent by weight calculated as metal. The atomic ratio of cobalt to phosphorus is 1:3. The catalyst is modified with trioctylphosphine. The mean residence time in the high pressure tube is four hours. The hydroformylation mixture obtained is cooled to 30°C, the pressure is let down to 3 atmospheres gauge and the excess mixture of carbon monoxide and hydrogen is separated. 14 g per hour of 2-ethylhexanoic acid is metered into the hydroformylation mixture (consisting essentially of $C_9$ to $C_{11}$ alcohols and aldehydes, their esters and acetals and also cobalt carbonyl which is modified with trioctylphosphine) and the mixture thus obtained is distilled in a Sambay evaporator at 125°C and at a pressure of 5 mm. 6 percent is separated from the distillation residue obtained (consisting essentially of esters and acetals of $C_9$ to $C_{11}$ aldehydes and alcohols, the cobalt carbonyl catalyst and cobalt fatty acid salts) and the remainder is returned to the high pressure tube. At the same time an amount of fresh catalyst (i.e. cobalt 2-ethylhexanote and trioctylphosphine dissolved in the olefin mixture feed) equivalent to the amount of cobalt and phosphine removed is fed in. No loss of cobalt is observed even after the catalyst has been recycled thirty-six times. The 2-ethylhexanoic acid is found to the extent of more than 80 percent in the distillate. Build-up of difficulty volatile esters of 2-ethylhexanoic acid is not observed in the distillation residue containing catalyst.

EXAMPLE 2

The procedure of Example 1 is followed but the 2-ethylhexanoic acid is replaced by 7 g of propionic acid. No loss whatever of cobalt can be established after recycling twenty times.

COMPARATIVE EXAMPLE

The procedure described in Example 1 is followed but the acid is supplied to the reactor with the makeup catalyst and 10 percent is separated from the distillation residue obtained, the catalyst being made up accordingly. After the catalyst has been recycled only three times the concentration of cobalt begins to decline and after fifteen times recycling amounts to only 0.12 percent in spite of the 10 percent makeup.

We claim:

1. A process for working up by distillation a hydroformylation mixture obtained by reaction of an olefin of three to twenty carbon atoms with carbon monoxide and hydrogen at a temperature of from 140° to 220°C and at a pressure of from 30 to 300 atmospheres in the presence of a cobalt, rhodium, ruthenium or iridium carbonyl complex which has been modified with a tertiary organic phosphine wherein the organic portion is selected from the group consisting of alkyl of one to thirty carbon atoms, cycloalkyl of five to twelve carbon atoms, aralkyl of seven to ten carbon atoms and aryl of six to ten carbon atoms as a substituent, said mixture containing from 60 to 70 percent by weight of produced aldehyde and alcohol containing one more carbon atom than the olefin used, from 15 to 30 percent by weight of the acetal of the aldehyde and alcohol produced and esters of said alcohol, and from 2 to 6 percent by weight of metal carbonyl complex and tertiary phosphine, wherein a fatty acid having three to ten carbon atoms is added to the hydroformylation mixture after the separation therefrom of excess carbon monoxide and hydrogen, and the resultant hydroformylation mixture is then distilled in the presence of the added fatty acid.

2. A process as claimed in claim 1 wherein from 0.1 to 3 moles of fatty acid is used per gram atom of catalyst metal.

* * * * *